3,297,642
PROCESS OF PRODUCING HIGH MOLECULAR
WEIGHT POLYOXYMETHYLENE
Hermann Richtzenhain, Cologne-Suelz, Paul Janssen, Cologne, and Wilhelm Vogt, Cologne-Suelz, Germany, assignors to Dynamit Nobel Aktiengesellschaft, Troisdorf, Germany, a corporation of Germany
No Drawing. Filed Nov. 14, 1962, Ser. No. 237,737
Claims priority, application Germany, Nov. 14, 1961, D 37,451
7 Claims. (Cl. 260—67)

The present invention relates to high molecular polyoxy methylene and more particularly to high molecular polyoxy methylene obtained by polymerization of trioxane, and to a process of making same.

Polymerization of monomeric formaldehyde to high molecular polyoxy methylene by means of suitable catalysts requires very expensive purification of the monomer. Therefore, processes have been developed according to which trioxane is used in place of formaldehyde as starting material for producing high molecular polyoxy methylenes. Trioxane can more readily be obtained in pure form than formaldehyde. The known processes use as polymerization catalysts inorganic chlorine compounds such as thionylchloride, phosphorus trichloride, tin tetrachloride, titanium tetrachloride, zirconium tetrachloride, or inorganic fluorine compounds, especially boron trifluoride or complex compounds of boron trifluoride. Alkane sulfonic acids have also been used as polymerization catalysts. These catalysts, however, are not fully satisfactory and the resulting polymerization products do not meet all the requirements.

It is one object of the present invention to provide a simple and effective process of polymerizing trioxane to high molecular polyoxy methylene.

Another object of the present invention is to provide new and valuable polymerization products of trioxane.

Other objects of the present invention and advantageous features thereof will become apparent as the description proceeds.

In principle the process according to the present invention consists in polymerizing trioxane with the addition of sulfur trioxide or compounds of sulfur trioxide with suitable complex forming compounds, for instance, with open chain or cyclic ethers or with compounds of elements of the fifth main group of the periodic system in their trivalent state as polymerization catalysts.

Polymerization of trioxane according to the process of the present invention may be carried out as block polymerization by mixing the catalyst with molten trioxane, preferably with the exclusion of air and moisture, and allowing the reaction mixture to stand at a temperature above 65° C. until polymerization is completed.

Polymerization of trioxane may also be effected with advantage in the presence of inert solvents or diluting agents. Aliphatic, cycloaliphatic, or aromatic hydrocarbons or chloro hydrocarbons such as dichloro methane, chloroform, carbon tetrachloride, 1,2-dichloro ethane, or the like are useful solvents or, respectively, diluting agents. Aliphatic or aromatic ethers may also be used.

The concentration of trioxane in the polymerization mixture may be varied considerably. When carrying out the polymerization at a temperature between about 0° C. and about 150° C. and preferably between about 20° C. and about 100° C. the trioxane is preferably polymerized in a concentration of 20–80%. Sulfur trioxide is preferably added in the form of its solution.

According to another embodiment of the present invention the vaporized trioxane is polymerized in the presence of gaseous sulfur trioxide. Such polymerization in the vapor phase is carried out, for instance, in a reactor into which trioxane vapors and sulfur trioxide, which is preferably diluted with an inert gas, i.e. nitrogen, carbon dioxide, helium, argon etc., are introduced simultaneously.

Depending upon the type of polymerization process used, the polymerization products are obtained in the form of a powder or a block. The catalyst is removed from the crude polymerization product, if necessary, after comminution by a treatment with suitable neutralizing agents in a solvent. Especially preferred solvents to remove the catalyst are aqueous or alcoholic solutions of ammonia or amines. Aqueous solution of salts, especially the alkali metal salts of weak acids may also be used for this purpose.

The concentration of the catalyst in the reaction mixture depends on the desired medium molecular size of the polymer. It varies between $10^{-4}$ mole percent and 1 mole percent and preferably between $10^{-3}$ mole percent and $10^{-1}$ mole percent, calculated for trioxane.

It is, of course, also possible to carry out polymerization of trioxane in the presence of sulfur trioxide and simultaneously of other known polymerization catalysts.

The polyoxy methylene obtained according to the present invention has a molecular weight which renders it especially suitable for further working up to high quality thermoplastic materials.

The following examples serve to illustrate the present invention without, however, limiting the same thereto.

*Example 1*

180 g. of trioxane are heated to 85° C. in a nitrogen atmosphere in a sealed vessel, while stirring. 0.36 cc. of a 1%, by weight, sulfur trioxide solution in 1,2-dichloro ethane are added from a microburette while kept therein under nitrogen. The polymerization mixture is treated at the same temperature of 85° C. for 4 more hours.

After cooling, the polymerization block is powdered and the powder is heated in a 2%, by weight, solution of ethanolamine in methanol to remove the catalyst. After drying in a vacuum of a water-jet vacuum pump at a temperature of 60° C. the resulting polyoxy methylene has a reduced viscosity of 2.8, measured in an 0.5%, by weight, solution of p-chloro phenol containing 2% of α-pinene at a temperature of 60° C.

The catalyst solution is prepared as follows: 5 cc. of oleum with 65%, by weight, of sulfur trioxide are added to one liter of purified and dried dichloro ethane. The mixture is distilled. The first 50 cc. are first runnings, which are not worked up. 500 cc. of a sulfur trioxide containing solution are then recovered. Its $SO_3$-content is determined by titration. A solution containing 1%, by weight, of sulfur trioxide in 1,2-dichloro ethane is obtained by the addition of the required amount of dichloro ethane.

*Example 2*

180 g. of trioxane and 0.72 cc. of 1%, by weight, solution of sulfur trioxide in dichloro ethane solution are polymerized at 80° C. as described in Example 1. After working up the polymerization mixture, a polyoxy methylene is obtained, which has a reduced viscosity of 1.5. The yield is 85% of the theoretical yield.

*Example 3*

0.5 cc. of the above described sulfur trioxide catalyst solution are added to 100.0 g. of trioxane in 100 cc. of benzine (boiling range: 80–120° C.) in a nitrogen atmosphere in an autoclave at a temperature of 75° C. After closing the reactor, the mixture is heated to 100° C. for one hour, and is then allowed to stand at 80° C. for 6 hours. After filtering off the polymerization product by suction, the catalyst is dissolved therefrom by boiling with a 2%, by weight, aqueous ammonia solution. The resulting product has a reduced viscosity of 1.6.

*Example 4*

100 g. of trioxane are polymerized with 0.4 cc. of a 1%, by weight, solution of sulfur trioxide-dioxanate in carbon tetrachloride by following the procedure described in Example 1. After working up the polymerization mixture, the resulting polymerization product has a reduced viscosity of 2.1.

*Example 5*

135 g. of trioxane are dissolved in 100 cc. of dichloro ethane at 75° C. in a 1 liter reaction vessel in a nitrogen atmosphere while stirring. 0.2 cc. of a 1%, by weight, sulfur trioxide solution in dichloro ethane and 0.2 cc. of boron trifluoride etherate are added. After closing the reactor, the mixture is kept at 75° C. without stirring for 6 hours and is cooled. The catalysts are washed out by a treatment with a 2%, by weight, ethanolamine solution in methanol. The resulting polyoxy methylene has a reduced viscosity of 1.6.

*Example 6*

A stream of dry nitrogen is being continuously circled from the bottom to the top of a uprightstanding cylindrical double-walled vessel of 150 l./volume, which is equipped with a discharge-screw in the funnel-shaped quarter of the bottom part. The nitrogen line is being heated at a temperature of 50–60° C., while the walls of the reaction vessel are cooled, so that the wall is at a temperature of 10° C., i.e., lower than the introduced nitrogen. The introduction rate of the nitrogen should not exceed 1 m./sec.$^{-1}$. Trioxane is distilled into the nitrogen stream at a rate of 1 kg./h., the SO$_3$-catalyst is vaporized at a rate corresponding 0.02%, by weight, based on the amount of trioxane introduced. The polymerization is carried out in the reaction vessel as described above, while a scraper removes the polymerization product from the wall. The polymerizate is being collected in the funnel-shaped bottom and discharged by the screw. The catalyst is being destroyed by washing the polymerization product with a 5%, by weight, solution of sodium acetate heated to 60° C. After drying in a vacuum of a water-jet vacuum pump at a temperature of 60° C., the resulting polyoxymethylene has a reduced viscosity of 3.9.

*Example 7*

120 g. of trioxane in 120 g. of cyclohexane with 6.10$^{-2}$%, by weight, of SO$_3$ are heated at a temperature of 80° C. in a sealed vessel equipped with a stirred until the polymerization starts. The mixture is cooled until the trioxane precipitates and reheated a few centigrades above the temperature of dissolution. This procedure is repeated 3 times at intervals of 20 minutes each. After the addition of 200 cc. of a 2%, by weight, solution of ethanolamine in methanol the resulting mixture was heated to a temperature of 80° C., the resulting product is filtered off by suction. Further treatment is carried out as described in Example 6. The polyoxymethylene has a reduced viscosity of 4.2.

*Example 8*

450 g. of trioxane (5 moles) dissolved (at a temperature of 60° C.) in 500 cc. of benzene are introduced into a dry, sealed vessel, which is kept under nitrogen. After cooling to a temperature of 20° C., a microcrystalline suspension of trioxane crystals in benzene results. 10 cc. of a 5%, by weight, solution of sulfur trioxide in carbon tetrachloride are added. The reaction vessel is heated, at a temperature of 50° C. the polymerization starts spontaneously. After addition of 500 cc. of a 2%, by weight, solution of ethanolamine in methanol the mixture is heated at a temperature of 65° C. for one hour. The cooled product is filtered off by suction. The polymer material is washed out with acetone. The drying is carried out as described in the preceding examples. The resulting polyoxymethylene has a reduced viscosity of 4.4. 75% of the trioxane were transformed into polyoxymethylene.

In place of the sulfur trioxide-dioxanate as used in Example 4, there may be employed other complex compounds of sulfur trioxide with complex forming compounds such as the ethers (i.e. diethyl ether, dichlorodiethylether, anisole etc.) and the corresponding thioethers, while the reaction is carried out substantially in the same manner as described in the preceding examples.

Compounds of the fifth main group of the periodic system which have proved to be useful catalysts in the polymerization process according to the present invention are, for instance, the triphenyl derivates of phosphorus, arsenic, antimony and bismuth.

Polyoxymethylenes with especially high molecular weight are achieved by conducting the polymerization in a suspension of microcrystalline trioxane in an inert solvent.

The molecular weight of the above described polyoxymethylenes are within the range of 5–300,000. The molecular weight can be derived from the mentioned reduced viscosity values by a formula of Lothar Höhr (Diplom-Arbeit, University of Mainz (Germany) (1960)).

Of course, many changes and variations may be made in the reaction conditions, the reaction temperature and duration, the solvents used, the inert gases employed, the type and amounts of catalysts added, the methods of working up the reaction mixture and of removing the catalyst, and the like by those skilled in the art in accordance with the principles set forth herein and in the claims annexed hereto.

We claim:

1. The process which comprises polymerizing trioxane in the presence of a solution of sulfur trioxide-boron trifluoride etherate mixture at a temperature in the range of about 20° to about 110° C. to a high molecular weight polyoxymethylene.

2. The process which comprises polymerizing trioxane in the presence of vaporous sulfur trioxide used in the range between about 10$^{-4}$ mole percent and about 1 mole percent calculated for trioxane at a temperature in the range of about 20° to about 110° C. to a high molecular weight polyoxymethylene.

3. The process which comprises polymerizing vaporized trioxane in the presence of gaseous sulfur trioxide to a high molecular weight polyoxymethylene.

4. The process of claim 3 which is carried out with sulfur trioxide in an amount of between about 10$^{-4}$ mole percent and about 1 mole percent calculated for trioxane.

5. The process which comprises polymerizing trioxane in the presence of a solution of sulfur trioxide ether complex at a temperature in the range of about 20° to about 110° C. to a high molecular weight polyoxymethylene.

6. The process of claim 5 in which the catalyst is sulfur trioxide-dioxanate.

7. The proces which comprises polymerizing trioxane in the presence of a sulfur trioxide-complex compound to a high molecular weight polyoxymethylene.

References Cited by the Examiner

UNITED STATES PATENTS

| | | | |
|---|---|---|---|
| 2,512,950 | 6/1950 | Londergan | 260—67 |
| 2,805,228 | 9/1957 | Smith | 260—327 |
| 2,947,727 | 8/1960 | Bartz | 260—67 |
| 2,951,059 | 8/1960 | Axtell et al. | 260—67 |
| 2,989,508 | 6/1961 | Hudgin et al. | 260—67 |
| 2,989,509 | 6/1961 | Hudgin et al. | 260—67 |
| 3,020,264 | 2/1962 | Behrends et al. | 260—67 |

OTHER REFERENCES

Kern et al.: Angewandte Chemie, 73 No. 6 (March 1961), pp. 177–186, pp. 179–182 relied upon.

WILLIAM H. SHORT, *Primary Examiner.*

L. M. MILLER, *Assistant Examiner.*